July 3, 1962  L. PÉRAS  3,041,689
REMOVABLY MOUNTING CLUSTERS OF SUPERPOSED FUSIBLE
PATTERNS ABOUT A DISPOSABLE CENTRAL ROD
Filed April 22, 1960  3 Sheets-Sheet 1

July 3, 1962  L. PÉRAS  3,041,689
REMOVABLY MOUNTING CLUSTERS OF SUPERPOSED FUSIBLE
PATTERNS ABOUT A DISPOSABLE CENTRAL ROD
Filed April 22, 1960  3 Sheets-Sheet 3
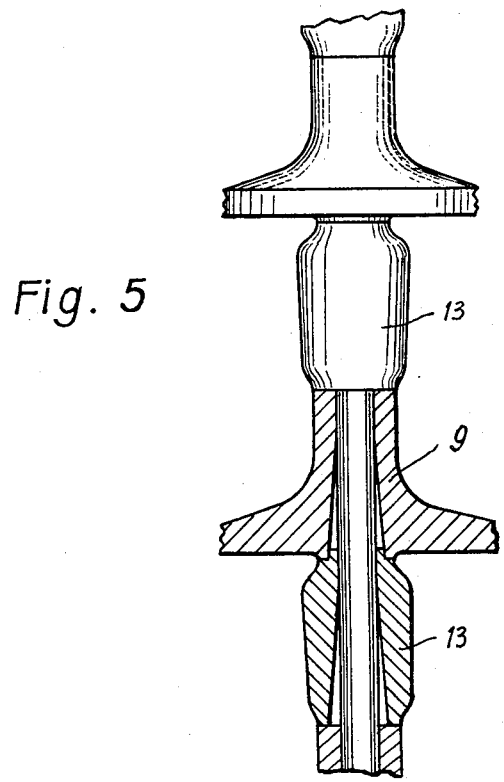
Fig. 5
Fig. 6
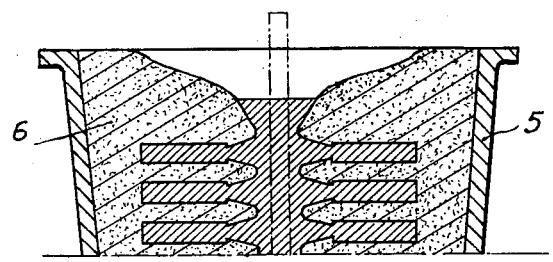

3,041,689
REMOVABLY MOUNTING CLUSTERS OF SUPERPOSED FUSIBLE PATTERNS ABOUT A DISPOSABLE CENTRAL ROD
Lucien Péras, Billancourt, France, assignor to Regie Nationale des Usines Renault, Billancourt, France
Filed Apr. 22, 1960, Ser. No. 24,178
Claims priority, application France Aug. 27, 1953
2 Claims. (Cl. 22—196)

This is a continuation in part of my co-pending application Ser. No. 441,827 of July 7, 1954, now abandoned.

This invention relates to a cluster-like arrangement of patterns and to a shaped member arrangement, wherein the shaped member acts both as a frame and as a casting sprue pattern in the so-called "lost-wax" precision casting processes.

As a rule, the wax or plastic casting sprue pattern is secured by welding or cementing on a plate constituting the bottom of the mold box. The sprue risers are subsequently attached by welding or other means on the central casting sprue pattern. However, these are time-robbing and scarcely convenient methods.

In other known systems the sprue riser patterns are made from the same fusible material constituting the casting patterns. The difficult, long assembling of the patterns by welding or soldering to one another to constitute the cluster and the welding of the complete cluster on the bottom plate of the mold lead to a fragile assembly.

On the other hand, it is also known in the molding of articles to use frame and bottom-plate devices constituting the casting sprue pattern and having at their centre a rod on which the pattern is mounted at one end, said rod being adapted to be removed together with the bottom plate in order to free the sprue thus obtained, as well as a riser-forming duct leading to the pattern itself.

However, in hitherto known devices of this character the rod supported the pattern directly and fixed the shape of the sprue; under these conditions, this sprue has the same length and diameter as the rod, the latter being generally cylindrical for stripping reasons.

According to the present invention, there are formed, in combination with a device of the type set forth hereinabove, clusters of patterns made from fusible material such as wax, these clusters comprising a hub-like central portion of like fusible material which is designed with a view to constitute, by stacking, a sprue of any desired shape and dimensions, spokes of same fusible material extending radially from this hub to constitute as many supports for each pattern, and at the same time feed ducts therefor.

According to another feature characterizing this invention, these hub-like portions are shaped to enable them to be easily stacked on one another and to bear on the aforesaid bottom plate, so that with this arrangement the only function of the rod is to act as a guide member for properly piling up the clusters and hold the resulting stacking together during the filling of the mold box with refractory material.

With the present invention, it is thus possible to impart a considerable strength to the cluster of thus assembled patterns while giving to the sprue the shapes most consistent with the filling of the multiple impressions during the casting process proper.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 5 shows on a larger scale a modified assembly of fusible plastic models, the rod surrounded by the casting models and risers, the latter forming a sprue having a shape independent of the rod shape, and FIGURE 6 shows a sectional view of a mold from which the patterns have been evacuated by melting and casting.

Figure 1:
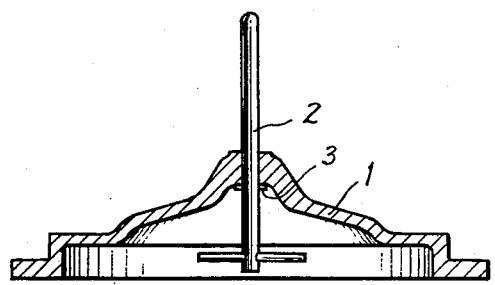
FIGURE 1 is an axial vertical section showing the plate constituting the bottom of the mold box with the axial rod or spindle positioned therein.

Referring to the drawings and notably to FIG. 1 it will be noted that the plate 1 constituting the bottom of the mold box or frame has substantially the shape of an inverted funnel and is formed with a gaged central orifice in which a locating rod 2 is adapted to slide with an easy fit; this rod 2 is intended for assembling the patterns or clusters of patterns to be reproduced. A pin 3 or any other equivalent means provided on the rod 2 is adapted to engage a shoulder of plate 1 to limit its upward movement. The plate 1 is coated with an insulating wax film.

Figure 2:
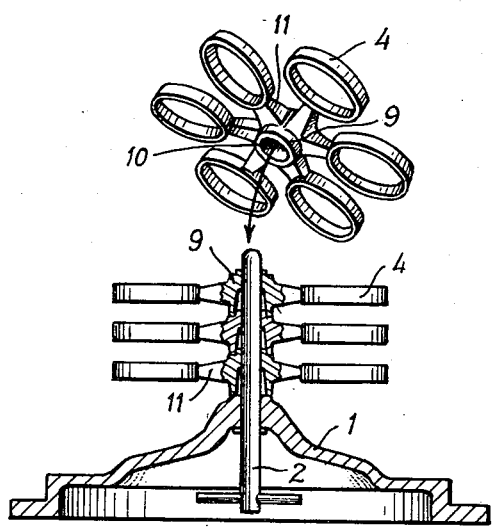
FIGURE 2 is a similar view showing the same bottom plate with a plurality of clusters of patterns threaded on the rod and a cluster ready to be positioned thereon.
Figure 3:
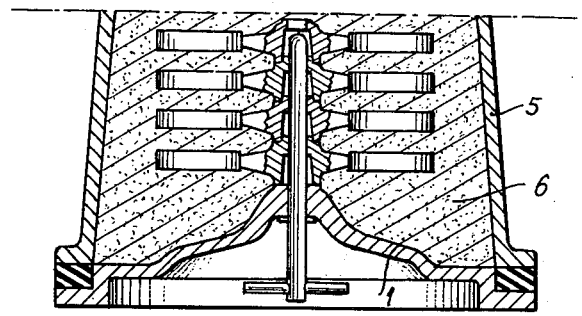
FIGURE 3 shows the mold after the mold-box and the refractory material have been placed thereon.

In FIGURE 2, a cluster of patterns 4 of fusible material formed with an integral hub-like central portion 9 having a central axial bore 10 and radial spokes 11 carrying the casting patterns proper 4 at their outer ends, is threaded with an easy fit on the rod 2. The assembly consisting of the plate 1 and rod 2 with the clusters of patterns is thus ready to receive the mold box 5 of the device, as shown in FIG. 3. The interior of the mold is then filled with refractory material 6 according to conventional practice.

Figure 4:
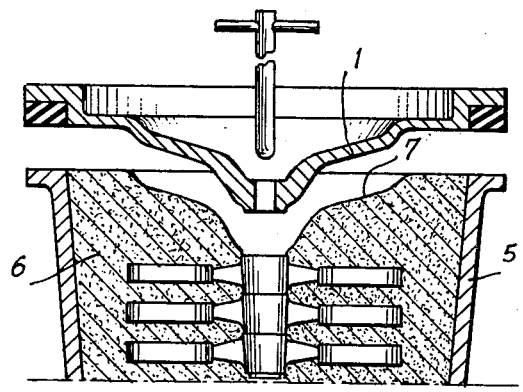
FIGURE 4 shows the mold assembly after it has been turned upside down, with the bottom plate and rod separated therefrom, prior to the casting step.

The mold is then completed. It is turned upside down and the rod 2 utilized for positioning the patterns is removed before filling the mold with refractory material. Then the bottom plate 1 of the mold may be readily removed after moderately heating this plate for melting the wax with which it had been coated beforehand, as shown in FIGURE 4.

Thus, the mold is formed with a funnel-shaped casting sprue 7 resulting from the conical configuration of the inner concave face of plate 1.

Then the patterns or clusters of patterns are cast. It will be seen that with the arrangement of this invention the melting of the hub-like portion with its spokes, as well as of the patterns proper, will provide capacities or cavities corresponding to the final castings plus the central sprue duct extension and the radial feed ducts; therefore, the external shape of this central sprue duct is definitely independent of the shape of the locating rod, as evidenced in FIG. 6.

Thus, according to this invention, the dimensions and shapes of the sprue are immaterial, for they are determined by the assembly of hubs of the patterns or pattern clusters, each hub providing one portion of the final duct and of the inlets leading to the patterns through the aforesaid "spokes."

With this arrangement and a single rod size it is possible to obtain sprue ducts and radial feed branches having exactly the shape and dimensions required for properly filling the impressions left by the molten patterns.

Thus, the central sprue duct may be formed on the one hand with bulged portions formed by intermediate members 13 acting as risers for filling the pattern impressions with molten metal (see FIG. 5), and on the other hand with junction radii in the radial duct inlets with a view to avoid sharp sand edges constituting a source of inclusions.

Thus, a casting method is provided which affords a faster pattern assembly as well as a reliable strength and stiffness of the pattern clusters, the components remaining unchanged irrespective of the number of parts or castings and the shape of the necessary casting sprue.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. Method of carrying out the precision casting of multiple identical parts according to the lost wax process, which consists in forming clusters of patterns made from easily fusible material, each cluster comprising a hub-like portion adapted to form one section of the sprue and formed with a central cavity, each hub-like portion having integral radial spokes extending therefrom for the purpose of forming the radial feed ducts leading to the actual casting cavities, and casting patterns disposed endwise of said spokes, and removably mounting each cluster so that the hub-like portions are axially but slidably superposed on a rod disposed vertically and adapted to slide through a bottom plate having a funnel-shaped pattern-facing side, disposing the assembly in a mold box, filling said mold box with refractory material, inverting said box, removing said rod and bottom plate, and melting the fusible material in order to provide the cavities defining the impressions for the castings, the feed ducts connecting said sprue to said impresions, as well as a funnel-like casting sprue for the casting metal.

2. Apparatus for carrying out the precision casting of multiple identical parts according to the lost-wax process, which comprises clusters of patterns made from easily fusible material, each pattern surrounding a hub of the same material and being connected thereto by means of spokes of the same material, each hub being formed with a central orifice, a mould-forming plate having the shape of an inverted funnel with the apex of the funnel being disposed to extend into the mould box from below when the clusters of patterns are positioned in the mould box, said plate being dimensioned to cover the mould box completely and having a central aperture extending axially through said apex, and a movable rod slidably extending through said aperture of said plate and retainable in position solely by frictional engagement with said last-named aperture, said rod being dimensioned to extend through and to receive removably the central orifice of each cluster of patterns to be reproduced with the clusters being in axial alignment about said rod and resting upon and being supported by the apex of said plate and said rod being free from load-bearing relationship with respect to said patterns, said plate leaving when removed a funnel-shaped channel leading to the central orifices of the clusters of patterns when the mould box is inverted and the plate removed therefrom, and means carried by said rod to limit the extent of insertion of said rod into said box.

References Cited in the file of this patent

UNITED STATES PATENTS

| | | |
|---|---|---|
| 1,387,558 | Roshein | Aug. 16, 1921 |
| 1,939,479 | Williams | Dec. 12, 1933 |
| 2,011,818 | Maison | Aug. 20, 1935 |

OTHER REFERENCES

Investment Casting for Engineers, pp. 118–135, R. W. Wood et al., Reinhold Publishing Co., 1952.

Precision Investment, pp. 239–260, Reinhold Publishing Co., 1948.